F. WAYNO.
ITALIAN CREAM MARKER.
APPLICATION FILED FEB. 16, 1915.

1,186,867.

Patented June 13, 1916.

Witnesses
Clyde Hobart
D. Foss

Inventor
Frank Wayno
By
N. T. Elliott
Attorney

THE COLUMBIA PLANOGRAPH CO., WASHINGTON, D. C.

UNITED STATES PATENT OFFICE.

FRANK WAYNO, OF TACOMA, WASHINGTON.

ITALIAN-CREAM MARKER.

1,186,867.  Specification of Letters Patent.  Patented June 13, 1916.

Application filed February 16, 1915. Serial No. 8,493.

*To all whom it may concern:*

Be it known that I, FRANK WAYNO, a citizen of the United States, and a resident of Tacoma, in the county of Pierce and State of Washington, have invented certain new and useful Improvements in Italian-Cream Markers, of which the following is a specification.

This invention relates to devices for forming grooves or marks in the surface of Italian-cream or other candy while it is yet in its soft state, in order that the candy can be broken along the lines of the grooves.

The objects of my invention are to provide a device which will make a number of such marks at a single stroke of the device, whereby the position of the marker on the candy mold may be quickly set so that the marks of the successive positions will be equispaced, for returning the marker to the starting point, to make the marks uniform in depth, and to save time and labor in marketing the candy in the mold.

I attain these and other objects by the devices illustrated in the accompanying drawing, in which—

Figure 1:
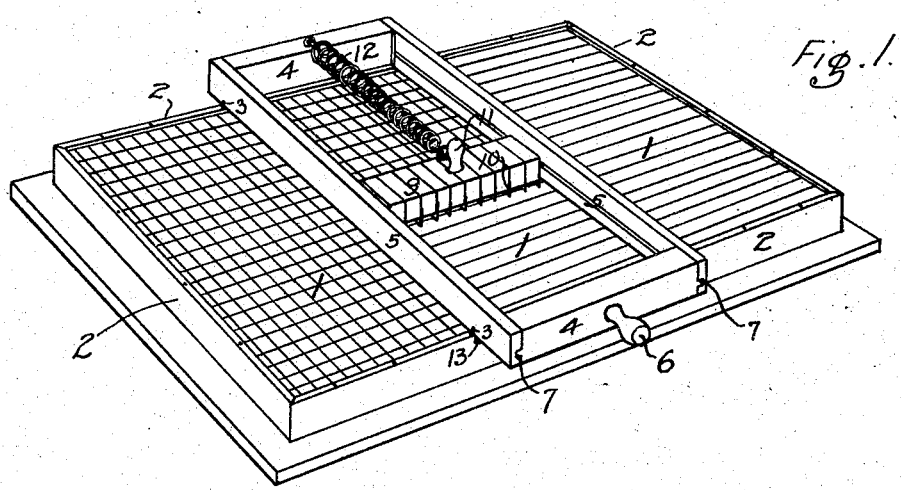
Figure 2:
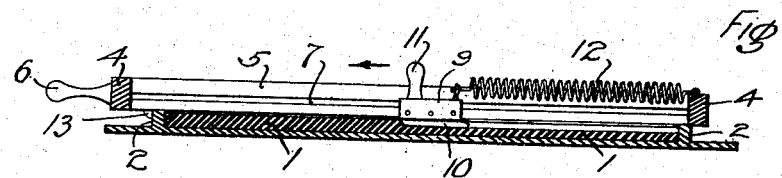
Figure 3:
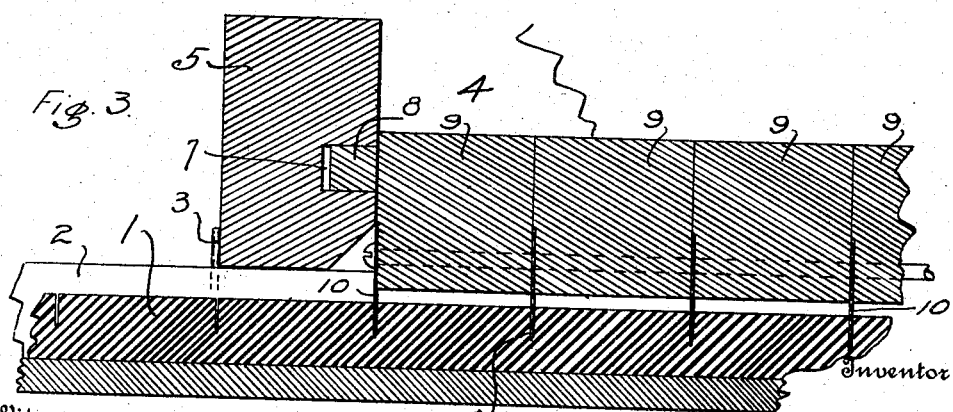

Figure 1 is a perspective view of the device in use; Fig. 2 is a vertical longitudinal section thereof; and Fig. 3 is a vertical cross-section thereof.

Similar numerals of reference refer to similar parts throughout the several views.

The candy 1 is poured into the mold 2 and its upper surface is brought to a level lower than the top of the mold. The mold may be of any convenient dimensions but is preferably such as to divide evenly into squares of the desired size so that there will be no waste along the edges thereof. A series of pins 3, or other suitable stops, project up from the top surface of the mold walls, said pins being preferably removable in order that they will not interfere with the operation of bringing the candy to the proper level. The purpose of these pins will be explained later.

The marker consists of a frame having two end members 4 which separate the long side members 5 thereof, one of said end members being provided with a suitable handle 6 wherewith the said frame is moved. Each side member 5 of the frame has a longitudinal groove 7 formed in its inwardly exposed side. A sliding member is mounted between the side members 5 and has a tongue 8 extending from each side, said tongues engaging the grooves 7 and supporting the said sliding member, without interfering with its free motion between the ends 4 of the frame. The sliding member is built up of a number of similar blocks 9, each of which is countersunk at its lower edge to receive the marker blades 10. The blades 10 are shaped substantially as shown, and extend down below the surface of the sliding member a distance sufficient to form marks or grooves of the required depth in the candy. The blocks 9 and blades 10 are all fastened together by means of suitable screws or bolts. An operating handle 11 is provided on the top surface of the sliding member.

A return spring 12 is secured between the rear end of the frame and the sliding member, so that when the member is released at the forward end of its stroke it will return to the starting point thus freeing the hand and allowing it to be used in shifting and placing the frame in its new position. A stop 13 may be secured to the under surface of the frame and adapted to engage the wall of the mold so that the said frame will always be brought to substantially the same relative position on the mold.

My device is operated as follows:—The mold 2 having been filled with candy 1 to the required level, the pins 3 are inserted in their places. Then the frame is placed on the mold walls with its side resting against a pair of said pins 3, and alined thereby, and with the stop 13 engaging the said wall. The position of the said stop pins is such as to space the first blade 10 of the marker the required distance from the edge of the mold. Then the handle 11 is gripped and the sliding member drawn toward the front end of the frame, marking the candy with the blades as it moves. The handle 11 is released and the frame transferred to engage the next pair of pins which are separated from the first pair so that the first knife will be spaced the required distance from the adjacent mark just made. The operation is repeated as often as needed and then the whole surface is similarly marked at right angles by placing the frame on the other walls of the mold and repeating the above operations.

Having described my invention, what I claim is:

1. In a candy marker, the combination with a mold adapted to hold candy at a uniform level and having the upper surfaces of its walls lying in a horizontal plane; of an elongated frame adapted to be placed on the upper surfaces of two opposite walls of the mold, said frame comprising two longitudinal parallel separated members provided with complementary grooves on their adjacent vertical sides; a sliding member fitting between said longitudinal frame members and having tongues extending from its sides and engaging said grooves; a plurality of markers extending downward from said sliding member and adapted to mark the surface of the candy; a handle secured to said sliding member whereby it may be drawn forward; a spring secured between the sliding member and the rear end of said elongated frame and adapted to draw the sliding member rearward; and removable guide pins projecting from the upper surface of the mold and adapted to be engaged by the side members of said frame whereby the said frame may be positioned in proper relative consecutive positions on the mold.

2. In a candy marker, the combination with a mold adapted to hold candy at a uniform level and having the upper surfaces of its walls lying in a horizontal plane; of an elongated frame adapted to be placed on the upper surfaces of two opposite walls of the mold, said frame comprising two longitudinal parallel separated members provided with complementary grooves on their adjacent vertical sides; a sliding member fitting between said longitudinal frame members and comprising a plurality of blocks positioned side by side, and having tongues extending from the extreme side blocks, said tongues engaging said grooves in the frame; a plurality of marker plates, secured between adjacent blocks of the sliding member and extending downward therefrom and adapted to mark the surface of the candy; means securing said blocks and said marker plates together to form one body; a handle secured to said sliding member whereby it may be drawn forward; a spring secured between the sliding member and the rear end of said elongated frame and adapted to draw the sliding member rearward; and removable guide pins projecting from the upper surface of the mold and adapted to be engaged by the side members of said frame whereby the said frame may be positioned in proper relative consecutive positions on the mold.

FRANK WAYNO.

Witnesses:
A. M. RICHARDS,
CLYDE HOBART.